United States Patent
Sauer (10) Patent No.: US 10,752,052 B2
(45) Date of Patent: Aug. 25, 2020

(54) ROTATABLE TWO TIRE LIFT

(71) Applicant: Steven J. Sauer, Lake Havasu City, AZ (US)

(72) Inventor: Steven J. Sauer, Lake Havasu City, AZ (US)

(*) Notice: Subject to any disclaimer, the term of this patent is extended or adjusted under 35 U.S.C. 154(b) by 127 days.

(21) Appl. No.: 16/218,439

(22) Filed: Dec. 12, 2018

(65) Prior Publication Data
US 2020/0189316 A1 Jun. 18, 2020

(51) Int. Cl.
| | |
|---|---|
| B60B 29/00 | (2006.01) |
| B62B 3/04 | (2006.01) |
| B62B 3/10 | (2006.01) |
| B60B 30/02 | (2006.01) |
| B60B 30/10 | (2006.01) |

(52) U.S. Cl.
CPC .......... *B60B 29/001* (2013.01); *B60B 29/002* (2013.01); *B60B 30/02* (2013.01); *B60B 30/10* (2013.01); *B62B 3/04* (2013.01); *B62B 3/104* (2013.01); *B60B 2340/12* (2013.01); *B60B 2340/14* (2013.01); *B60B 2340/34* (2013.01); *B60B 2340/36* (2013.01); *B60B 2340/70* (2013.01); *B60B 2900/521* (2013.01); *B62B 2202/031* (2013.01); *B62B 2203/21* (2013.01)

(58) Field of Classification Search
CPC ..... B60B 29/001; B60B 30/10; B60B 29/002; B60B 30/02; B60B 2900/521; B60B 2340/34; B60B 2340/70; B60B 2340/14; B60B 2340/12; B60B 2340/36; B60B 2340/30; B60B 2340/32; B60B 2340/50; B60B 29/00; B60B 30/00; B62B 2202/031; B66F 5/00; B66F 5/02

USPC .................................................. 414/426, 427
See application file for complete search history.

(56) References Cited

U.S. PATENT DOCUMENTS

| | | | |
|---|---|---|---|
| 2,380,415 | A | 7/1945 | Carruthers |
| 4,123,038 | A | 10/1978 | Meyers |
| 4,625,947 | A | 12/1986 | Denman et al. |
| 5,230,598 | A * | 7/1993 | Steves, Jr. ............. B60B 29/002 254/2 R |
| 6,095,745 | A | 8/2000 | Garnett |
| 7,611,126 | B2 | 11/2009 | Vesa |
| 9,302,543 | B1 * | 4/2016 | Pierce .................... B60B 30/10 |
| 9,440,491 | B1 | 9/2016 | Belliveau |
| 10,035,688 | B1 * | 7/2018 | Robinson ............... B60B 30/04 |

(Continued)

OTHER PUBLICATIONS www_rotarylift_com-Accessories.pdf.
MohawkLiftsSpecialtyLiftAccessoriesTD-1000TireDolly.pdf.
LM-200-R_QualityStainlessProdu.pdf.

*Primary Examiner* — Mark C Hageman
(74) *Attorney, Agent, or Firm* — Mark V. Loen (57) ABSTRACT

The embodied invention is a two tire lift tower and platform that is movable on castors. A motorized belt system is used to lift the tires. The belt system is mounted on each tower and is connected to a horizontal tire lifting bar. It is designed for portability by using a rechargeable battery is mounted on a rotating frame that allows each tire to be lifted separately. Simple buttons operate the tire belt lifting design that also allows for motor speed control to be adjusted by the operator. The dual belt system ensures that the horizontal lift bar is adequately maintained in a horizontal orientation. The maintenance of the unit is relatively simple due to the simplified design.

5 Claims, 7 Drawing Sheets

(56) References Cited

U.S. PATENT DOCUMENTS

| | | | |
|---|---|---|---|
| 2009/0035107 A1* | 2/2009 | Duran | B60B 29/002 |
| | | | 414/426 |
| 2012/0057954 A1* | 3/2012 | Bardin | B60B 30/02 |
| | | | 414/427 |
| 2016/0280519 A1 | 9/2016 | Abraham | |

* cited by examiner

ROTATABLE TWO TIRE LIFT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

(1) Field of the Invention

This invention is directed to tire lifting and transporting equipment, and in particular, tire lifting equipment at a location where tires are frequently serviced.

(2) Description of Related Art

Tire removal—lifting and changing in a commercial tire operation is usually not ergonomic. Tires for automobiles, personal trucks, and SUV's weigh approximately 20-80 lbs and are difficult to maneuver. They are often removed from automobiles that are on a car lift, and the tires are manually moved/removed. This causes exhaustion and repetitive injuries for the workers who service vehicles.

Others have worked in the art of tire lifts and caddies. For example, U.S. Pat. No. 9,440,491 is a tire caddy with castors that support a frame. It could be fairly characterized as a tire jack to aid in installation/removal of a tire on a vehicle. Unfortunately, it is limited in use as it can only hold a single tire and is operated manually. As another example, US Publication no 20160280519 is limited in use for the similar reasons.

U.S. Pat. No. 4,123,038 describes a tire lift and moving frame operated by a small manually operated hydraulic jack. It does not provide efficient movement in a commercial processing facility as it only holds one tire at a time and is manually operated. No method for adjusting for various tire diameters is provided. It is specially designed for large tires such as found in agriculture equipment.

What is needed in the art is a tire lifting device that can simultaneously hold two tires on the tire lift to aid in efficient tire movement when tires are routinely rotated in normal tire maintenance. Also, it will provide for ease in removal of tires, and installation of new ones.

BRIEF SUMMARY OF THE INVENTION

The embodied invention is a two tire lift tower and platform that is movable on castors. A motorized belt system is used to lift the tires. The belt system is mounted on each tower and is connected to a horizontal tire lifting bar. It is designed for portability by using a rechargeable battery that is mounted on a rotating frame that allows each tire to be lifted separately. Simple buttons operate the tire belt lifting design that also allows for motor speed control to be adjusted by the operator. The dual belt system ensures that the horizontal lift bar is adequately maintained in a horizontal orientation. The maintenance of the unit is relatively simple due to the simplified design.

DETAILED DESCRIPTION OF THE INVENTION

The embodied invention is directed toward addressing the needs of the marketplace by improving convenience, speed, and ergonomic features of a tire lift that is useful in tire repair and replacement facilities.

An important improvement is a compact two tire lift design that allows convenient replacement of tires with a second tire that is also mounted on the two tire lift. The lifting structure is designed to rotate around a base frame so that either of the two tire lifting supports can be positioned to remove or install a tire. This feature greatly improves the convenience and ergonomics when rotating all four tires on a vehicle. In contrast, if a single tire lift is used, the tires constantly have to be lifted off and on and off the single tire lift to accomplish the same task.

Another important feature is to add a variable speed to the vertical lift movement of the tires. The tires can be moved quickly or slowly to precisely position the tire where needed.

Another important feature is to provide battery power to the two tire lift and install the batteries on the lift so that the wiring is simplified. No power extension cord is needed to operate the lift.

Another important feature is to utilize a base wide enough for stability when one or two tires are supported. The base has to be large enough so that the tires will be stable when the two tire lift is rotated or moved from tire to tire.

Another important feature is to provide for improved stability and tire positioning on the tire supports for a variety of tire diameters. To that end result, the horizontal tire supports are designed for 180 degree rotation so that support is possible for a narrow tire diameter and a wider width. This simple adjustment reasonably covers typical tire diameters and does not allow the tire to be so low on the lift as to be awkward, or so high on the lift to easily fall off.

Another important feature is to provide a two belt lifting design where each belt is substantially located on the ends of a horizontal tire lifting bar. To improve robustness, the belts are powered by a common power shaft. This provides important coordination for the two belts so that the lift mechanism does not jamb. The belts clamped to a bracket which is connected to the horizontal lift bar. The brackets are guided vertically by rollers located inside vertical slots. The two belt drive system provides for more generous tolerances between the bracket rollers and the vertical slots. This facilitates simple tension adjustments during assembly.

Another important feature is to provide for easy access to tire lug nuts by locating lifting equipment away from the lug nut circle.

In a preferred embodiment, cogged belts are utilized to raise and lower the horizontal lift bars. Alternately and equally, the belts are chains or cables. Smooth belts are also used but are not preferred as jamming the horizontal bar in the vertical slots is more likely.

In the illustrated embodiment, the height of the towers is a matter of how high the tires will be lifted off the ground. Typically, the overall height is about 3½ to 4½ feet, and the base dimensions are about 20×25". However, in some cases, a taller two tire lift is more suitable, and the base dimensions are proportionately larger to accommodate transporting tires safely over an uneven floor. The caster wheels under the base are preferably inflated rubber tires to better accommodate rough flooring.

In the illustrated embodiment, a reversible DC motor drives the vertical motion of the lift. The DC motor is powered by a battery, such as 12 volts, and is charged by plugging into a 120 VAC power outlet. The electrical circuit that controls the DC motor includes multiple three position rocker switches that return to the center (off) position. The rocker switches are used to move the horizontal lift bar up and down. Redundant switches are included on each side of the two tire lift for the convenience of the operator reach. Also, speed control dials are used to control the speed of the lift for precise (or fast) vertical positioning of the tire.

Figure 1:
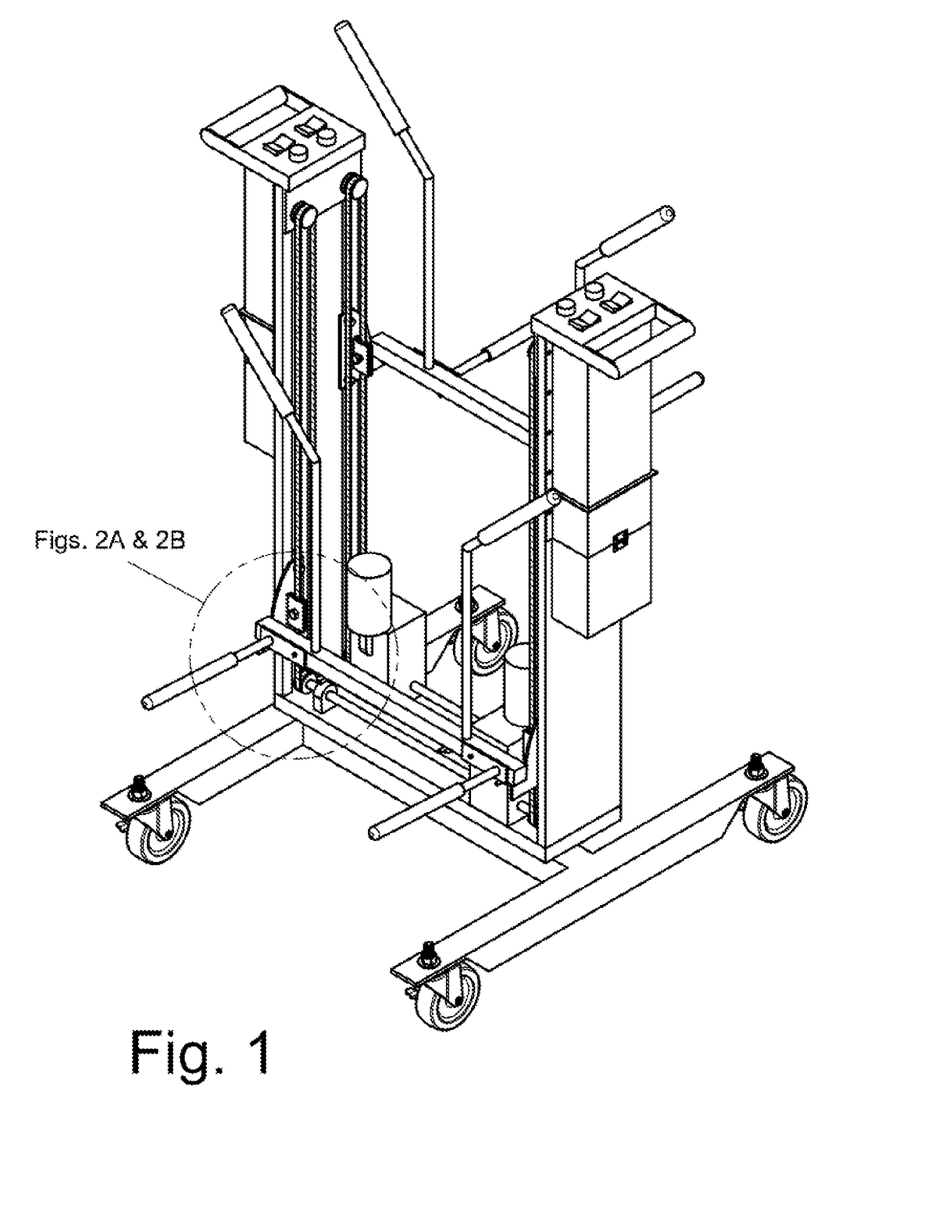
FIG. 1 shows a perspective view of the embodied invention.

FIG. 1 shows an isometric view of the horizontal tire lift and indicates a detailed view.

Figure 2A:
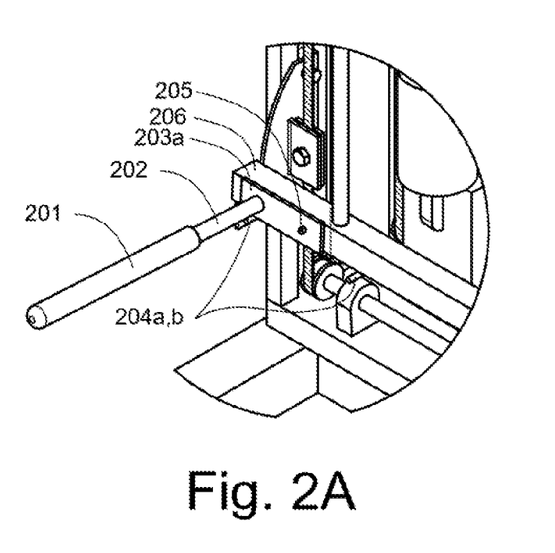
FIGS. 2A-2B show details of an important tire diameter adjustment feature.
Figure 2B:
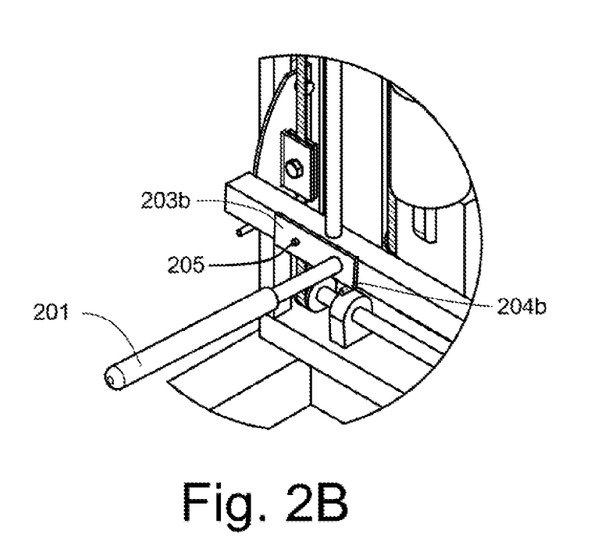

FIGS. 2A-2B illustrate details of the embodied invention. In FIG. 2A, a tire support roller 201 is positioned to hold a tire. The support roller proximal end is screwed onto the distal end of a tire support mounting bar 202. The tire support mounting bar is connected to a rotating plate 203a that is shown in the position for a wider tire. A pin 205 connects the rotating plate to the front horizontal lift bar 206a. The pin is welded or bolted onto the horizontal bar. Rotation stops 204a,b are located underneath the rotating plate are welded to the horizontal lift bar and provide a two position rotating plate. In FIG. 2B, the rotating plate 203b is rotated 180 degrees around the pin 205 so as to be re-positioned for a narrow tire. To facilitate stability, the rotating pin includes a threaded end and nut (not shown) to prevent the rotating plate from sliding off the pin.

Figure 5:
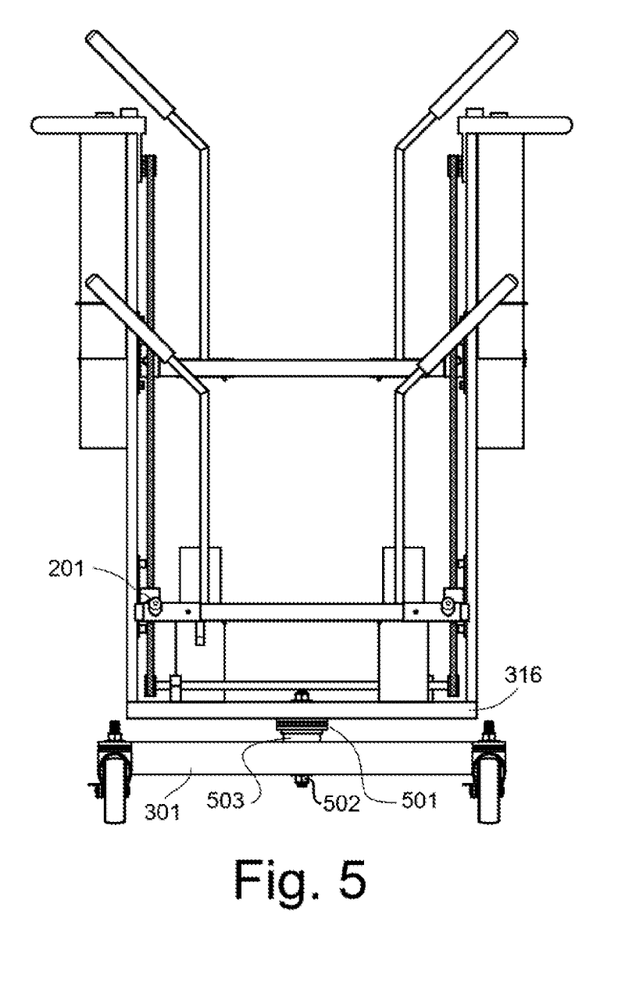
FIG. 5 shows a thrust bearing position in the tire lift assembly.

The distal end of horizontal tire support rollers are preferably rotated 2-4 degrees upwardly (as seen in FIG. 5) to support a tire so as to tip it slightly toward the center of the two tire lift.

Figure 3:
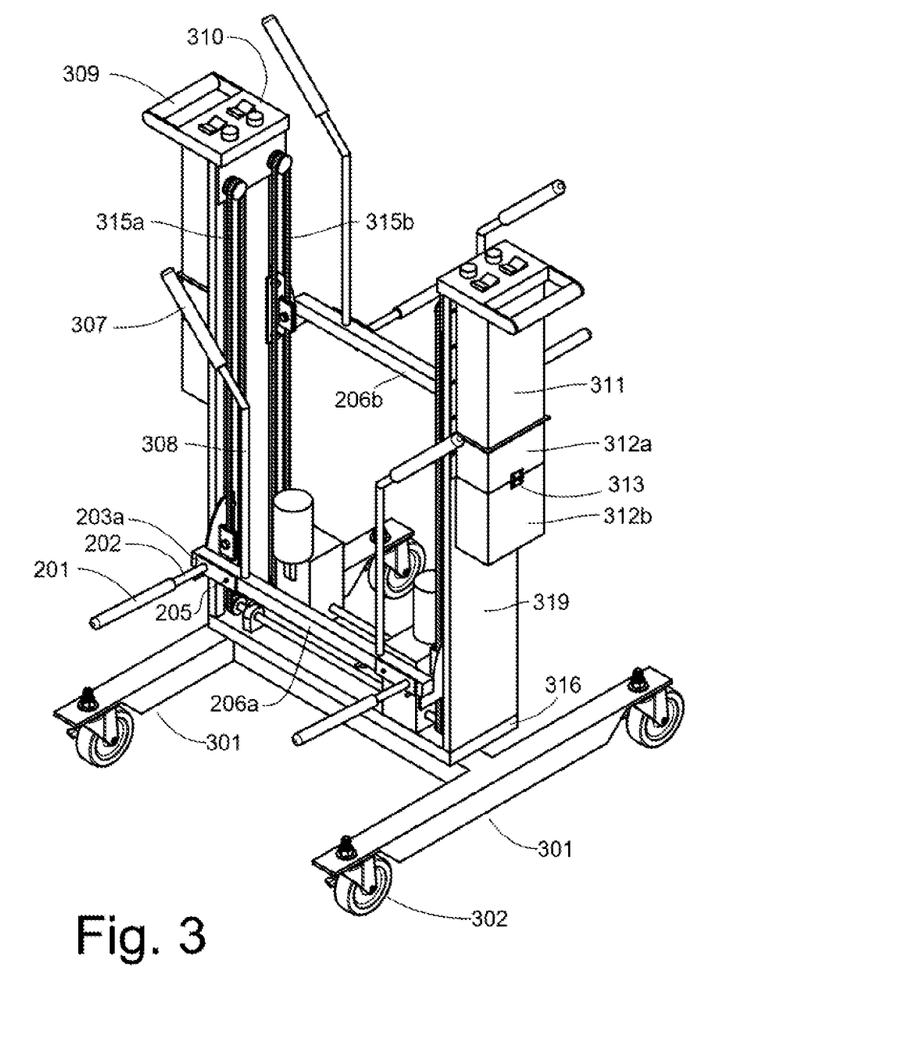
FIG. 3 is a perspective view of the embodied invention highlighting many features.

FIG. 3 shows detailed parts of the two tire lift assembly of FIG. 1. A base 301 with casters 302 provide for positioning movement of the two tire lift assembly. A vertical tire support roller 307 is threaded onto a vertical tire support 308. A handle 309 located on a handle plate 310 is used to move the two tire lift assembly into a desired position, and to manually rotate the tire lift. A battery/electrical system is covered by an upper cover 311 and a two part lower cover 312a,b that are connected by a hinge 313. The hinge on the split lower cover provides easier access to the battery and controls. The top belt pulleys are connected to eccentric bearings (see FIGS. 4A-4B) for belt tensioning, which in turn, are connected to a handle plate 310 (see vertical support plate 404 in FIG. 4A). Belts 315a,b are wrapped around top belt pulleys and lower belt pulleys. Details of the belts and belt pulleys are shown in FIGS. 4A-4C.

A front lift slot and a back lift slot, are formed from a metal extrusion 319. The extrusion is bolted to the rotating base plate 316 on the lower end and is connected to handles on the upper end.

The front horizontal lift bar 206a and a back horizontal lift bar 206b are also shown.

Figures 4A, 4B:
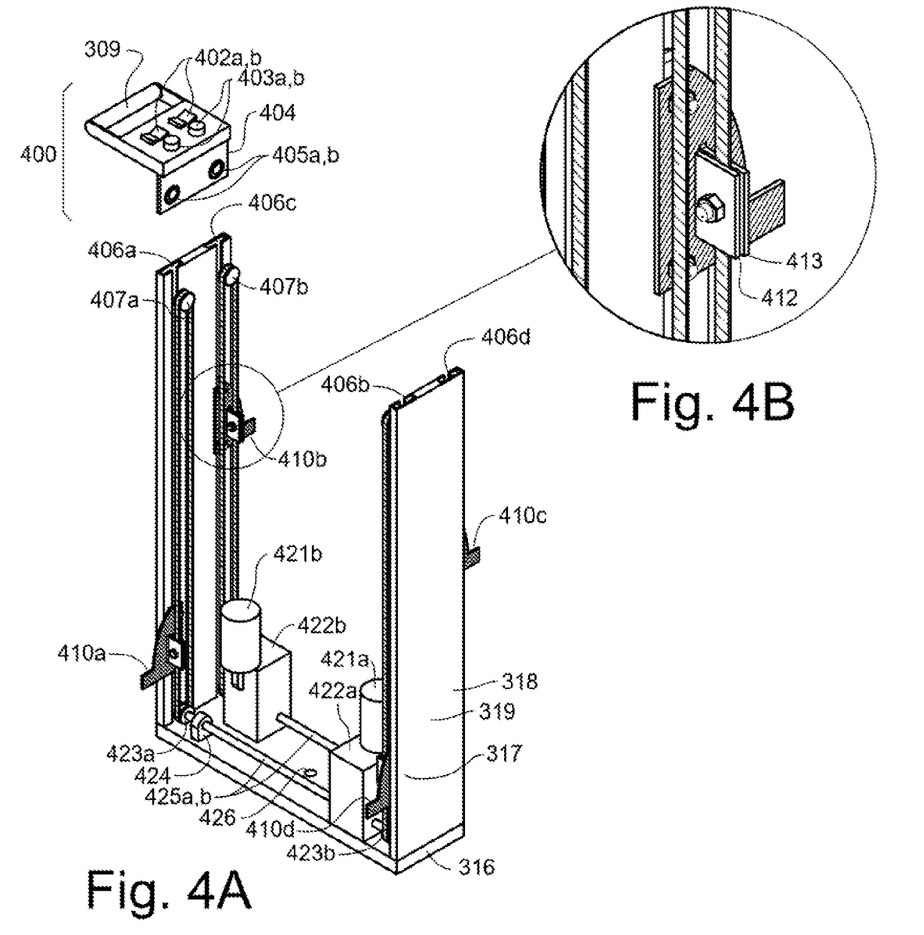
FIGS. 4A-4C show important details of the belts, drive chain, and tire lift mechanism.
Figure 4C:
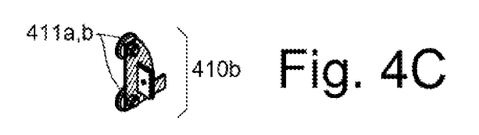

FIGS. 4A-4C show important parts of the belt drive system which causes the horizontal lift bars to move up and down. In FIG. 4A, a handle assembly 400 includes a handle 309, two rocker switches 402a,b (front and back respectively), two speed adjustment knobs 403a,b (front and back respectively) that are connected to rheostats (not shown), a vertical support plate 404, and two eccentric bearings 405a,b (front and back respectively).

The three-position rocker switches are used to operate the DC motors 421a,b (front and back respectively) and include a center off position. The operator must keep the toggle switch down for the motor to lift/lower the tire, because the rocker switches incorporate a spring to re-center the switch to off when not pressed. On each handle, left and right, the two toggle switches provide for improved convenience when operating the horizontal lift bar. Also, on each handle, two speed control knobs 403a,b (front and back respectively) to change the speed at which the horizontal lift bar moves.

Four roller slot openings 406a,b (front) and 406c,d (back) provide vertical guidance for bracket rollers 411a,b for a typical bracket assembly 410b (see FIG. 4C). FIG. 4B shows how the bracket assembly is connected to the belt by use of a clamping plate 412 which is bolted to a corresponding fixed clamp plate 413 that is welded to the bracket assembly 410b. To clamp to the belt to the bracket, a small section of the belt is cut out to allow the bolt to pass through. Because there is redundancy in this design, the horizontal lift bar will not drop suddenly if one of the belts were to break or slip out of the clamp.

Two upper idler belt pulleys 407a,b are connected to eccentric bearings 405a,b which are mounted on the vertical support plate 404. The eccentric bearings provide for belt tension by adjusting the vertical position of the idler belt pulleys.

Power for driving the belts is supplied by two DC motors 421a,b (front/back) which are connected to two gear boxes 422a,b (front/back) to cause the belts to raise/lower at a maximum speed of about 6 inches per second. The gear boxes are connected to power shafts 425a,b (front/back) which in turn rotate the lower belt pulleys 423a,b (front/back). A front shaft support bearing 424 is shown and a back shaft bearing is similarly provided but is not seen in this view.

Though it is not shown in the figures, it is preferable to include belt covers for improved personnel safety, and to keep the belts free of accidental damage.

A center hole 426 is provided in the rotating base plate 316 to facilitate thrust bearing assembly with a bolt 502 (see FIG. 5) and the rotating vertical axis for the rotating base plate.

FIG. 5 shows a thrust bearing 501 with a lower plate that is connected to a pipe spacer 503. The pipe spacer is connected to the base frame 301. The thrust bearing has an upper plate that is connected to the rotating base plate 316. A connecting bolt 502 is tightened sufficiently to allow the base frame and rotating plate to rotate and maintain the vertical stability of the two tire lift.

Figure 6:
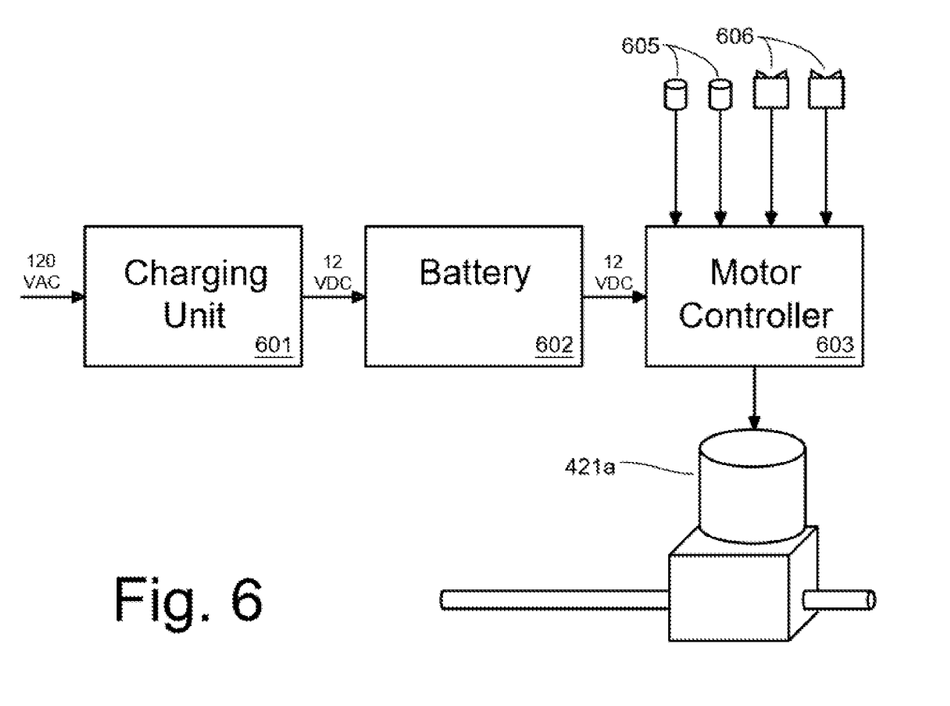
FIG. 6 is a simplified electrical diagram of the tire lift allowing for reversible motors to raise and lower a tire.
Figure 7:
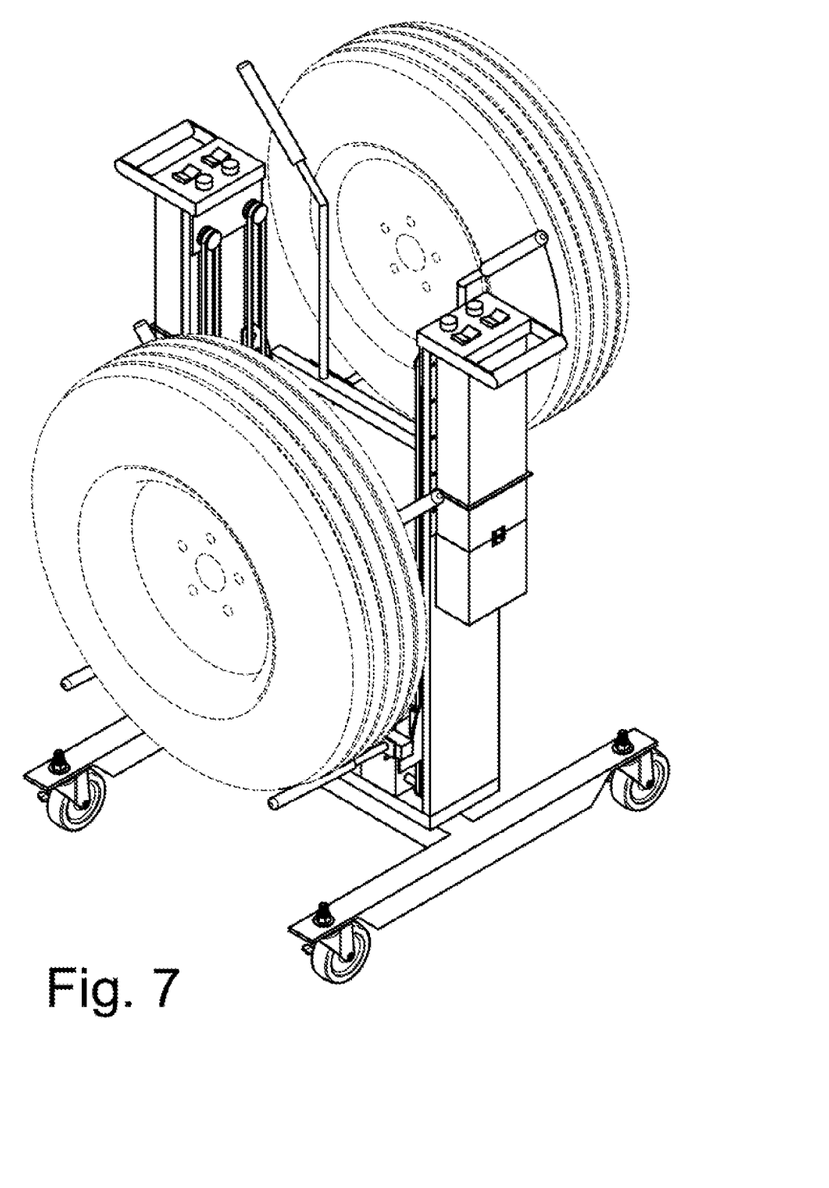
FIG. 7 shows how the embodied invention holds a typical tire on each side of the tire lift.

FIG. 6 shows a simplified motor control circuit that will control one of the DC reversible motors (421a,b in FIG. 4A) on each side of the two tire lift. Though only one circuit is shown, it is replicated for the second DC reversible motor. 120 VAC power is supplied to a battery charging unit 601 which charges a 12 VDC battery 602. The battery may be any one of a number of varieties, but an exemplary type is a sealed 12 Volt lead acid battery. The battery provides power to a motor controller 603 which controls the motor and direction. A pair of three way rocker switches 606 and a pair of motor speed pots 605 control the direction of the current through the DC reversible motors and the speed. The motor control circuit will include suitable fuses (not shown) for battery charging and safe motor control.

It is generally conceived that the battery charging unit is used for charging the battery overnight, or for supplying power when the battery fails by using an extension cord. The battery will power the unit during normal use as portability provides improved flexibility in positioning the unit. No external extension cords are used in normal operation.

While various embodiments of the present invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. A mobile two tire lift comprising:
   A. a base frame with a plurality of wheels and a center hole,
   B. a horizontally oriented rotating plate with a vertical center rotating axis and a thickness in the vertical direction,
   C. a thrust bearing sandwiched between said base frame and said rotating plate, wherein said thrust bearing is centered on said center rotating axis and said center hole,
   D. two tire lifting assemblies, wherein each tire lifting assembly comprises:
      a. a horizontal lift bar,
      b. a pair of vertical tire supports connected to said horizontal lift bar,
      c. a pair of horizontal tire supports each connected to a rotating support plate, wherein each said rotating support plate is connected to said horizontal lift bar by a horizontal pin,
      d. a guide bracket attached to each end of said horizontal lift bar,
      e. a pair of guide rollers attached to each said guide bracket,
      f. wherein each said pair of guide rollers is located inside a vertical slot,
      g. wherein each said guide bracket is attached to a lift belt,
      h. wherein each lift belt is rotatably connected to an upper belt pulley and a lower belt pulley,
      i. a handle assembly with a motor movement switch and a motor speed knob, and
      j. a power train to drive each said lower belt pulley further comprising,
         i. a variable speed reversible motor,
         ii. a horizontally oriented shaft,
         iii. gearing to connect said variable speed reversible motor with said shaft,
         iv. wherein said shaft is connected to each said lower belt pulley,
         v. motor control circuitry to connect said motor movement switch and said motor speed knob to said variable speed reversible motor, and
         vi. a battery connected to said motor control circuitry, E. Said two tire lifting assemblies coupled to said rotating plate.

2. The mobile two tire lift according to claim 1 wherein a charging circuit is used to charge said battery.

3. The mobile two tire lift according to claim 1 wherein any said lift belt is a cogged lift belt.

4. The method of lifting a tire on a portable two tire lift comprising:
   I) providing:
      A. a base frame with a plurality of wheels and a center hole,
      B. a horizontally oriented rotating plate with a vertical center rotating axis and a thickness in the vertical direction,
      C. a thrust bearing sandwiched between said base frame and said rotating plate, wherein said thrust bearing is centered on said center rotating axis and said center hole,
      D. two tire lifting assemblies, wherein each tire lifting assembly comprises:
         a. a horizontal lift bar,
         b. a pair of vertical tire supports connected to said horizontal lift bar,
         c. a pair of horizontal tire supports each connected to a rotating support plate, wherein each said rotating support plate is connected to said horizontal lift bar by a horizontal pin,
         d. a guide bracket attached to each end of said horizontal lift bar,
         e. a pair of guide rollers attached to each said guide bracket,
         f. wherein each said pair of guide rollers is located inside a vertical slot,
         g. wherein each said guide bracket is attached to a lift belt,
         h. wherein each lift belt is rotatably connected to an upper belt pulley and a lower belt pulley,
         i. a handle assembly with a motor movement switch and a motor speed knob, and
         j. a power train to drive each said lower belt pulley further comprising,
            i. a variable speed reversible motor,
            ii. a horizontally oriented shaft,
            iii. gearing to connect said variable speed reversible motor with said shaft,
            iv. wherein said shaft is connected to each said lower belt pulley,
            v. motor control circuitry to connect said motor movement switch and said motor speed knob to said variable speed reversible motor, and
            vi. a battery connected to said motor control circuitry, E. Said two tire lifting assemblies coupled to said rotating plate,
   II) positioning a tire onto said horizontal tire supports on at least one tire lifting assembly,
   III) utilizing said motor movement switch to move said tire vertically.

5. The method according to claim 4 further comprising:
   I) utilizing said motor speed knob to control a speed of said motor.

* * * * *